United States Patent
Lenglet et al.

(10) Patent No.: US 11,128,550 B2
(45) Date of Patent: Sep. 21, 2021

(54) LOGICAL NETWORK TRAFFIC ANALYSIS

(71) Applicant: Nicira, Inc., Palo Alto, CA (US)

(72) Inventors: Romain F. Lenglet, Mountain View, CA (US); Rajiv Ramanathan, Palo Alto, CA (US); Jun Xiao, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 120 days.

(21) Appl. No.: 16/672,374

(22) Filed: Nov. 1, 2019

(65) Prior Publication Data

US 2020/0067799 A1   Feb. 27, 2020

Related U.S. Application Data

(63) Continuation of application No. 14/587,559, filed on Dec. 31, 2014, now Pat. No. 10,469,342.

(60) Provisional application No. 62/062,768, filed on Oct. 10, 2014.

(51) Int. Cl.
   *H04L 12/26* (2006.01)

(52) U.S. Cl.
   CPC ............ *H04L 43/024* (2013.01); *H04L 43/12* (2013.01)

(58) Field of Classification Search
   CPC ............................. H04L 43/024; H04L 43/12
   See application file for complete search history.

(56) References Cited

U.S. PATENT DOCUMENTS

| | | |
|---|---|---|
| 5,224,100 A | 6/1993 | Lee et al. |
| 5,245,609 A | 9/1993 | Ofek et al. |
| 5,265,092 A | 11/1993 | Soloway et al. |

(Continued)

FOREIGN PATENT DOCUMENTS

| | | |
|---|---|---|
| EP | 1154601 A1 | 11/2001 |
| JP | 2002141905 A | 5/2002 |

(Continued)

OTHER PUBLICATIONS

Phaal, Peter, et al., "sFlow Version 5," Jul. 2004, 46 pages, available at http://www.sflow.org/sflow_version_5.txt.
Phan, Doantam, et al., "Visual Analysis of Network Flow Data with Timelines and Event Plots," VizSEC 2007, Month Unknown 2007, 16 pages.

*Primary Examiner* — Minh Chau Nguyen
(74) *Attorney, Agent, or Firm* — Adeli LLP

(57) ABSTRACT

Some embodiments of the invention provide a method for gathering data for logical network traffic analysis by sampling flows of packets forwarded through a logical network. Some embodiments are implemented by a set of network virtualization controllers that, on a shared physical infrastructure, can implement two or more sets of logical forwarding elements that define two or more logical networks. In some embodiments, the method (1) defines an identifier for a logical network probe, (2) associates this identifier with one or more logical observation points in the logical network, and (3) distributes logical probe configuration data, including sample-action flow entry data, to one or more managed forwarding elements that implement the logical processing pipeline at the logical observation points associated with the logical network probe identifier. In some embodiments, the sample-action flow entry data specify the packet flows that the forwarding elements should sample and the percentage of packets within these flows that the forwarding elements should sample.

21 Claims, 10 Drawing Sheets

(56) References Cited

U.S. PATENT DOCUMENTS

| | | |
|---|---|---|
| 5,504,921 A | 4/1996 | Dev et al. |
| 5,550,816 A | 8/1996 | Hardwick et al. |
| 5,729,685 A | 3/1998 | Chatwani et al. |
| 5,751,967 A | 5/1998 | Raab et al. |
| 5,781,534 A | 7/1998 | Perlman et al. |
| 6,104,699 A | 8/2000 | Holender et al. |
| 6,104,700 A | 8/2000 | Haddock et al. |
| 6,141,738 A | 10/2000 | Munter et al. |
| 6,219,699 B1 | 4/2001 | McCloghrie et al. |
| 6,430,160 B1 | 8/2002 | Smith et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,658,002 B1 | 12/2003 | Ross et al. |
| 6,680,934 B1 | 1/2004 | Cain |
| 6,721,334 B1 | 4/2004 | Ketcham |
| 6,785,843 B1 | 8/2004 | McRae et al. |
| 6,941,487 B1 | 9/2005 | Balakrishnan et al. |
| 6,963,585 B1 | 11/2005 | Pennec et al. |
| 6,999,454 B1 | 2/2006 | Crump |
| 7,013,342 B2 | 3/2006 | Riddle |
| 7,062,559 B2 | 6/2006 | Yoshimura et al. |
| 7,079,544 B2 | 7/2006 | Wakayama et al. |
| 7,180,856 B1 | 2/2007 | Breslau et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,243,143 B1 | 7/2007 | Bullard |
| 7,283,473 B2 | 10/2007 | Arndt et al. |
| 7,342,916 B2 | 3/2008 | Das et al. |
| 7,391,771 B2 | 6/2008 | Orava et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,370 B1 | 1/2009 | Dayal et al. |
| 7,555,002 B2 | 6/2009 | Arndt et al. |
| 7,577,131 B2 | 8/2009 | Joseph et al. |
| 7,590,133 B2 | 9/2009 | Hatae et al. |
| 7,602,723 B2 | 10/2009 | Mandato et al. |
| 7,606,260 B2 | 10/2009 | Oguchi et al. |
| 7,627,692 B2 | 12/2009 | Pessi |
| 7,633,955 B1 | 12/2009 | Saraiya et al. |
| 7,639,625 B2 | 12/2009 | Kaminsky et al. |
| 7,643,488 B2 | 1/2010 | Khanna et al. |
| 7,649,851 B2 | 1/2010 | Takashige et al. |
| 7,706,266 B2 | 4/2010 | Plamondon |
| 7,710,874 B2 | 5/2010 | Balakrishnan et al. |
| 7,729,245 B1 | 6/2010 | Breslau et al. |
| 7,760,735 B1 | 7/2010 | Chen et al. |
| 7,764,599 B2 | 7/2010 | Doi et al. |
| 7,792,987 B1 | 9/2010 | Vohra et al. |
| 7,802,000 B1 | 9/2010 | Huang et al. |
| 7,808,919 B2 | 10/2010 | Nadeau et al. |
| 7,808,929 B2 | 10/2010 | Wong et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,937,492 B1 | 5/2011 | Kompella et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,024,478 B2 | 9/2011 | Patel |
| 8,027,354 B1 | 9/2011 | Portolani et al. |
| 8,031,606 B2 | 10/2011 | Memon et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,161,270 B1 | 4/2012 | Parker et al. |
| 8,166,201 B2 | 4/2012 | Richardson et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,254,273 B2 | 8/2012 | Kaminsky et al. |
| 8,265,062 B2 | 9/2012 | Tang et al. |
| 8,265,075 B2 | 9/2012 | Pandey |
| 8,281,067 B2 | 10/2012 | Stolowitz |
| 8,290,137 B2 | 10/2012 | Yurchenko et al. |
| 8,306,043 B2 | 11/2012 | Breslau et al. |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,558 B2 | 1/2013 | Nicholson et al. |
| 8,351,418 B2 | 1/2013 | Zhao et al. |
| 8,359,576 B2 | 1/2013 | Prasad et al. |
| 8,456,984 B2 | 6/2013 | Ranganathan et al. |
| 8,504,718 B2 | 8/2013 | Wang et al. |
| 8,565,108 B1 | 10/2013 | Marshall et al. |
| 8,571,031 B2 | 10/2013 | Davies et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,644,188 B1 | 2/2014 | Brandwine et al. |
| 8,645,952 B2 | 2/2014 | Biswas et al. |
| 8,750,288 B2 | 6/2014 | Nakil et al. |
| 8,762,501 B2 | 6/2014 | Kempf et al. |
| 8,806,005 B2 | 8/2014 | Miri et al. |
| 8,837,300 B2 | 9/2014 | Nedeltchev et al. |
| 8,838,743 B2 | 9/2014 | Lewites et al. |
| 8,929,221 B2 | 1/2015 | Breslau et al. |
| 9,059,926 B2 | 6/2015 | Akhter et al. |
| 9,197,529 B2 | 11/2015 | Ganichev et al. |
| 9,226,220 B2 | 12/2015 | Banks et al. |
| 9,280,448 B2 | 3/2016 | Farrell et al. |
| 9,282,019 B2 | 3/2016 | Ganichev et al. |
| 9,344,349 B2 | 5/2016 | Ganichev et al. |
| 9,407,580 B2 | 8/2016 | Ganichev et al. |
| 9,602,334 B2 | 3/2017 | Benny |
| 9,860,151 B2 | 1/2018 | Ganichev et al. |
| 9,898,317 B2 | 2/2018 | Nakil et al. |
| 10,044,581 B1 | 8/2018 | Russell |
| 10,181,993 B2 | 1/2019 | Ganichev et al. |
| 10,200,306 B2 | 2/2019 | Nhu et al. |
| 2001/0020266 A1 | 9/2001 | Kojima et al. |
| 2001/0043614 A1 | 11/2001 | Viswanadham et al. |
| 2002/0093952 A1 | 7/2002 | Gonda |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2004/0073659 A1 | 4/2004 | Rajsic et al. |
| 2004/0098505 A1 | 5/2004 | Clemmensen |
| 2004/0186914 A1 | 9/2004 | Shimada |
| 2004/0267866 A1 | 12/2004 | Carollo et al. |
| 2004/0267897 A1 | 12/2004 | Hill et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0111445 A1 | 5/2005 | Wybenga et al. |
| 2005/0120160 A1 | 6/2005 | Plouffe et al. |
| 2005/0132044 A1 | 6/2005 | Guingo et al. |
| 2005/0182853 A1 | 8/2005 | Lewites et al. |
| 2005/0220096 A1 | 10/2005 | Friskney et al. |
| 2005/0232230 A1 | 10/2005 | Nagami et al. |
| 2006/0002370 A1 | 1/2006 | Rabie et al. |
| 2006/0026225 A1 | 2/2006 | Canali et al. |
| 2006/0028999 A1 | 2/2006 | Iakobashvili et al. |
| 2006/0029056 A1 | 2/2006 | Perera et al. |
| 2006/0037075 A1 | 2/2006 | Frattura et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0206655 A1 | 9/2006 | Chappell et al. |

(56) References Cited

U.S. PATENT DOCUMENTS

| | | |
|---|---|---|
| 2006/0218447 A1 | 9/2006 | Garcia et al. |
| 2006/0221961 A1 | 10/2006 | Basso et al. |
| 2006/0282895 A1 | 12/2006 | Rentzis et al. |
| 2006/0291388 A1 | 12/2006 | Amdahl et al. |
| 2007/0050763 A1 | 3/2007 | Kagan et al. |
| 2007/0055789 A1 | 3/2007 | Claise et al. |
| 2007/0064673 A1 | 3/2007 | Bhandaru et al. |
| 2007/0097982 A1 | 5/2007 | Wen et al. |
| 2007/0156919 A1 | 7/2007 | Potti et al. |
| 2007/0260721 A1 | 11/2007 | Bose et al. |
| 2007/0286185 A1 | 12/2007 | Eriksson et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0049614 A1 | 2/2008 | Briscoe et al. |
| 2008/0049621 A1 | 2/2008 | McGuire et al. |
| 2008/0049786 A1 | 2/2008 | Ram et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0112551 A1 | 5/2008 | Forbes et al. |
| 2008/0159301 A1 | 7/2008 | Heer |
| 2008/0240095 A1 | 10/2008 | Basturk |
| 2009/0010254 A1 | 1/2009 | Shimada |
| 2009/0100298 A1 | 4/2009 | Lange et al. |
| 2009/0109973 A1 | 4/2009 | Ilnicki |
| 2009/0150527 A1 | 6/2009 | Tripathi et al. |
| 2009/0292858 A1 | 11/2009 | Lambeth et al. |
| 2009/0327903 A1 | 12/2009 | Smith et al. |
| 2010/0128623 A1 | 5/2010 | Dunn et al. |
| 2010/0131636 A1 | 5/2010 | Suri et al. |
| 2010/0188976 A1* | 7/2010 | Rahman ............... H04L 47/10 370/235 |
| 2010/0214949 A1 | 8/2010 | Smith et al. |
| 2010/0232435 A1 | 9/2010 | Jabr et al. |
| 2010/0254385 A1 | 10/2010 | Sharma et al. |
| 2010/0275199 A1 | 10/2010 | Smith et al. |
| 2010/0306408 A1 | 12/2010 | Greenberg et al. |
| 2011/0022695 A1 | 1/2011 | Dalal et al. |
| 2011/0075664 A1 | 3/2011 | Lambeth et al. |
| 2011/0085557 A1 | 4/2011 | Gnanasekaran et al. |
| 2011/0085559 A1 | 4/2011 | Chung et al. |
| 2011/0085563 A1 | 4/2011 | Kotha et al. |
| 2011/0128959 A1 | 6/2011 | Bando et al. |
| 2011/0137602 A1* | 6/2011 | Desineni ............... G06F 11/261 702/117 |
| 2011/0194567 A1 | 8/2011 | Shen |
| 2011/0202920 A1 | 8/2011 | Takase |
| 2011/0261825 A1 | 10/2011 | Ichino |
| 2011/0299413 A1 | 12/2011 | Chatwani et al. |
| 2011/0299534 A1 | 12/2011 | Koganti et al. |
| 2011/0299537 A1 | 12/2011 | Saraiya et al. |
| 2011/0305167 A1 | 12/2011 | Koide |
| 2011/0317559 A1 | 12/2011 | Kern et al. |
| 2011/0317696 A1 | 12/2011 | Aldrin et al. |
| 2012/0079478 A1 | 3/2012 | Galles et al. |
| 2012/0159454 A1 | 6/2012 | Barham et al. |
| 2012/0182992 A1 | 7/2012 | Cowart et al. |
| 2012/0275331 A1* | 11/2012 | Benko .................. H04L 43/026 370/252 |
| 2012/0287791 A1 | 11/2012 | Xi et al. |
| 2013/0024579 A1 | 1/2013 | Zhang et al. |
| 2013/0031233 A1 | 1/2013 | Feng et al. |
| 2013/0041934 A1* | 2/2013 | Annamalaisami ........................ H04L 47/2483 709/203 |
| 2013/0044636 A1 | 2/2013 | Koponen et al. |
| 2013/0054761 A1 | 2/2013 | Kempf et al. |
| 2013/0058346 A1 | 3/2013 | Sridharan et al. |
| 2013/0067067 A1 | 3/2013 | Miri et al. |
| 2013/0125120 A1 | 5/2013 | Zhang et al. |
| 2013/0163427 A1 | 6/2013 | Beliveau et al. |
| 2013/0163475 A1 | 6/2013 | Beliveau et al. |
| 2013/0332602 A1 | 12/2013 | Nakil et al. |
| 2013/0332983 A1 | 12/2013 | Koorevaar et al. |
| 2013/0339544 A1 | 12/2013 | Mithyantha |
| 2014/0019639 A1 | 1/2014 | Ueno |
| 2014/0029451 A1 | 1/2014 | Nguyen |
| 2014/0115578 A1 | 4/2014 | Cooper et al. |
| 2014/0119203 A1 | 5/2014 | Sundaram et al. |
| 2014/0126418 A1 | 5/2014 | Brendel et al. |
| 2014/0157405 A1 | 6/2014 | Joll et al. |
| 2014/0177633 A1 | 6/2014 | Manula et al. |
| 2014/0195666 A1 | 7/2014 | Dumitriu et al. |
| 2014/0207926 A1 | 7/2014 | Benny |
| 2014/0219086 A1* | 8/2014 | Cantu' ................ H04L 12/4641 370/231 |
| 2014/0281030 A1 | 9/2014 | Cui et al. |
| 2014/0282823 A1 | 9/2014 | Rash et al. |
| 2014/0304393 A1 | 10/2014 | Annamalaisami et al. |
| 2015/0016286 A1 | 1/2015 | Ganichev et al. |
| 2015/0016287 A1 | 1/2015 | Ganichev et al. |
| 2015/0016298 A1 | 1/2015 | Ganichev et al. |
| 2015/0016469 A1 | 1/2015 | Ganichev et al. |
| 2015/0043378 A1 | 2/2015 | Bardgett et al. |
| 2015/0180755 A1 | 6/2015 | Zhang et al. |
| 2015/0281036 A1 | 10/2015 | Sun et al. |
| 2016/0105333 A1 | 4/2016 | Lenglet et al. |
| 2016/0149791 A1 | 5/2016 | Ganichev et al. |
| 2016/0226741 A1 | 8/2016 | Ganichev et al. |
| 2017/0358111 A1 | 12/2017 | Madsen |
| 2018/0102959 A1 | 4/2018 | Ganichev et al. |
| 2018/0262447 A1 | 9/2018 | Nhu et al. |
| 2018/0262594 A1 | 9/2018 | Nhu et al. |
| 2019/0109769 A1 | 4/2019 | Jain et al. |
| 2019/0140931 A1 | 5/2019 | Ganichev et al. |

FOREIGN PATENT DOCUMENTS

| | | |
|---|---|---|
| JP | 2003069609 A | 3/2003 |
| JP | 2003124976 A | 4/2003 |
| JP | 2003318949 A | 11/2003 |
| WO | 9506989 A1 | 3/1995 |
| WO | 2012126488 A1 | 9/2012 |
| WO | 2013184846 A1 | 12/2013 |
| WO | 2015005968 A1 | 1/2015 |

\* cited by examiner

LOGICAL NETWORK TRAFFIC ANALYSIS

CLAIM OF BENEFIT TO PRIOR APPLICATIONS

This present Application is a continuation application of U.S. patent application Ser. No. 14/587,559, filed Dec. 31, 2014, now published as U.S. Patent Publication 2016/0105333. U.S. patent application Ser. No. 14/587,559 claims the benefit of U.S. Provisional Patent Application 62/062, 768, filed Oct. 10, 2014. U.S. patent application Ser. No. 14/587,559, now published as U.S. Patent Publication 2016/0105333 is incorporated herein by reference.

BACKGROUND

Network virtualization provides network abstractions (network equipment, network services, etc.) that provide the same services and have the same behavior as network hardware equipment, but is independent from the physical implementation of those network abstractions. For instance, logical networks may provide abstractions such as logical L2 switches, logical L3 routers, logical DHCP servers, etc. that provide the same services and have the same behavior as their physical counterparts from the viewpoint of clients connected to those abstractions.

Typical implementations of logical networks rely on network overlays, i.e. sets of tunnels that forward the packets forwarded through a logical network over a fabric of physical networking equipment. Using network overlays or other techniques, logical network abstractions are decoupled from the physical hardware, e.g. logical L2 switches are typically not tied to the physical L2 switches in the fabric, and logical L3 routers are typically not tied to physical L3 routers in the fabric.

The decoupling between logical and physical network equipment allows for more efficient and flexible management. Logical network abstractions can be managed by software without requiring managing the physical equipment comprising the fabric. One advantage of this decoupling for management is the potential to perform monitoring in a more flexible way than in physical networks. A logical network's whole topology is typically known and managed by a logical network management system from a centralized point, and the connections between abstractions is easily managed in software. This allows for both more fine-grained control over monitoring, e.g. at the scale of individual packet forwarding rules in logical abstractions, and large-scale monitoring, e.g. at the scale of a whole logical network.

SUMMARY

Some embodiments of the invention provide a method for performing logical network traffic analysis by sampling packets forwarded through a logical network. Some embodiments are implemented by a set of network virtualization controllers that, on a shared physical infrastructure, can implement two or more sets of logical forwarding elements that define two or more logical networks.

In some embodiments, the method defines an identifier for a logical network probe. The method then associates the logical network probe to one or more logical observation points in the logical network. In some embodiments, the logical observation points can be any ingress or egress port of a logical forwarding element (e.g., a logical switch or logical router), or can be at any decision making point in the logical processing pipeline (e.g., at a firewall rule resolution or network address translation point in the logical processing pipeline) for processing packets received from a data compute node (e.g., a virtual machine, computer, etc.).

The method then generates data for a sample-action flow entry in the logical processing pipeline associated with each logical observation point. The method distributes the sample-action flow entry data to a set of managed forwarding elements (e.g., hardware forwarding elements or a software forwarding element that executes on a host computing device with one or more virtual machines) that are for processing data packets associated with the set of logical observation points. The set of managed forwarding elements are part of a group of managed forwarding elements that implement the logical network. Each managed forwarding element in the set uses a sample-action flow entry to identify the logical-network packets that it needs to sample. In some embodiments, the distributed sample-action flow entry data includes a set of sample-action flow entries. In other embodiments, the distributed sample-action flow entry data is data that allows the set of managed forwarding elements to produce sample-action flow entries. In some embodiments, each sample-action flow entry has the logical network probe identifier and a set of matching criteria, and the distributed sample-action flow entry data includes this information.

In some embodiments, a logical observation point can correspond to one or more physical observation points in one or more managed forwarding elements. The method distributes the sample-action flow entry data to each managed forwarding element that is supposed to process the flow entry for packets at the physical observation point. The sample-action flow entry causes the forwarding element to sample packets at the observation points based on a set of matching criteria. The matching criteria set of each sample-action flow entry defines the types of packet flows that are candidates for sampling for the logical network probing. However, not all the packets that satisfy the matching criteria set will have to be sampled in some embodiments. This is because in some embodiments, the matching criteria includes a user-definable sampling percentage criteria, which causes the forwarding element to only sample a certain percentage of the packets that satisfy the other matching criteria.

Once a managed forwarding element determines that a packet matches a sample-action flow entry and should be sampled, the managed forwarding element samples the packet and sends the sampled data to a location. In some embodiments, the location is a daemon (e.g., a control plane daemon or data plane daemon) of the managed forwarding element (MFE). This daemon forwards the sampled data to a set of data collectors (e.g., one or more servers) that analyze the sampled packet data for the logical network. In some embodiments, this daemon gathers sample data for one or more logical observation points on the forwarding element, and forwards the collected data periodically to the data collector set, while in other embodiments the daemon forwards the received data in real time to the data collector set. In some of the embodiments in which the daemon gathers the sample data, the daemon produces flow analysis data for each flow that is sampled, and sends this flow analysis data to the data collector set. For instance, in some embodiments, the daemon periodically sends the data collector set the following data tuple for each sampled flow: flow's identifier data (e.g., flow's five tuple), packet count, byte count, start time stamp, and end time stamp.

In other embodiments, the MFE directly sends the sample data to the data collector set after sampling this data. In some embodiments, some sample-action flow entries send the sample-packet data to the MFE daemon, while other sample-action flow entries send the sample-packet date directly to the data collector set. In some embodiments, the location that is to receive the sampled data is specified in the sample-action flow entry, while in other embodiments, this location is part of the forwarding elements configuration for the logical network probe.

When the forwarding element forwards the sample-packet data to the location specified in the sample-action flow entry, the forwarding element also forwards the logical network probe identifier that is specified in the sample-action flow entry. The forwarding-element daemons and the data collectors use the logical network probe identifiers to analyze the sample-packet data that they receive and generate analysis data that summarize the sample data that they receive. For instance, the logical network probe identifier can be used by collectors to differentiate the monitoring statistics received from a single forwarding element for multiple probes defined on the forwarding element, and to aggregate the statistics received from multiple forwarding elements for a single probe instantiated on multiple forwarding element.

The preceding Summary is intended to serve as a brief introduction to some embodiments of the invention. It is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

DETAILED DESCRIPTION

Figure 1:
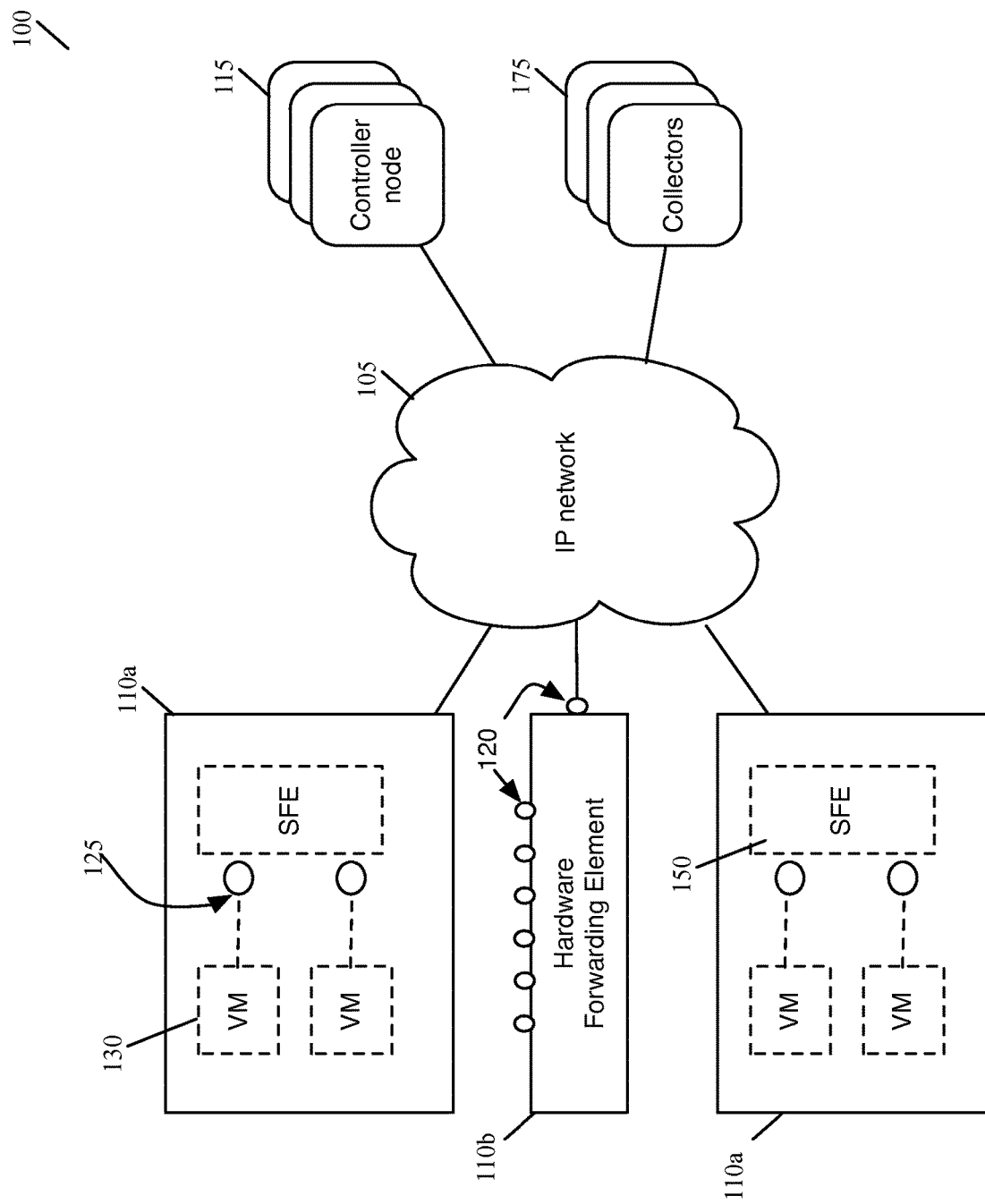
FIG. 1 illustrates the network virtualization system of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for gathering data for logical network traffic analysis (e.g., for conformance testing, accounting management, security management, etc.) by sampling flows of packets forwarded through a logical network. Some embodiments are implemented by a set of network virtualization controllers that, on a shared physical infrastructure, can implement two or more sets of logical forwarding elements that define two or more logical networks. The physical infrastructure includes several physical forwarding elements (e.g., hardware or software switches and routers, etc.) that are managed by the network virtualization controllers to implement the logical forwarding elements. These forwarding elements are referred to as managed forwarding elements (MFEs).

In some embodiments, the method (1) defines an identifier for a logical network probe, (2) associates this identifier with one or more logical observation points in the logical network, and (3) distributes logical probe configuration data, including sample-action flow entry data, to one or more managed forwarding elements that implement the logical processing pipeline at the logical observation points associated with the logical network probe identifier. In some embodiments, the sample-action flow entry data specify the packet flows that the forwarding elements should sample and the percentage of packets within these flows that the forwarding elements should sample.

Also, in some embodiments, the sample-action flow entry data and/or logical probe configuration data includes the locations to which the forwarding elements should forward the sampled data and the type of data to include in the sampled data. The data that is included in returned sample data includes a portion or the entire sampled packet and includes the logical network probe identifier, in order to allow the supplied data to be aggregated and analyzed. In this document, the term "packet" is used to refer to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

Before describing the collection of logical network packet sampling through the sample-action flow entries of some embodiments, the network virtualization system of some embodiments will be first described by reference to FIG. 1. This figure illustrates a system 100 in which some embodiments of the invention are implemented. This system includes a set of network virtualization controllers 115 (also called controller nodes below) that flexibly implement the logical network probing method of some embodiments through the logical network management software that they execute, without requiring the configuration of the individual network equipment or using dedicated network equipment. The controller nodes 115 provide services such as coordination, configuration storage, programming interface, etc. In some of these embodiments, the controllers 115 implement two or more logical networks over a shared physical infrastructure. In some embodiments, the controllers 115 decouple the logical network abstractions from the physical network equipment, by implementing the logical networks through network tunnel overlays (e.g., through GRE tunnels, MPLS tunnels, etc.).

As shown in FIG. 1, the system 100 also includes one or more data collectors 175 that collect logical network sample data. As further shown, the controller nodes and the data collectors connect to several transport nodes 110 through an IP network 105 that includes the shared physical infrastructure. The transport nodes 110 provide logical network ports (e.g. Ethernet (L2) ports) that can be either hardware ports 120 connected to physical equipment (e.g., computers or physical forwarding elements), or software ports 125 (sometimes called virtual ports) connected to virtual machines 130 executing on the transport nodes. In other words, transport nodes in some embodiments include (1) host computing devices 110a on which software forwarding elements 150 execute, and (2) standalone hardware forwarding elements 110b. The software and hardware forwarding elements are managed by the controller nodes 115 to implement two or more logical networks. Hence, these forwarding elements are referred to below as managed forwarding elements (MFEs).

In some embodiments, the transport and control nodes can communicate through the IP protocol over the physical interconnection network 105, which is used to transport both application data packets between transport nodes 110, and control service data from the controller nodes 115. In some embodiments, the application data packets are transmitted between transport nodes over a tunneling protocol (e.g., GRE or MPLS), with those tunnels forming an overlay network that interconnects the transport nodes over the IP network.

Physical and logical equipment connected to the transport nodes' logical ports are given the illusion that they are interacting with physical network equipment, such as L2 switches and L3 routers, as specified in the logical network configuration. The logical network configuration includes the logical network equipment (e.g. logical L2 switches and logical L3 routers), their configuration, and their logical interconnection. In some embodiments, the logical network is configured by users via an API provided by the control nodes 115.

The logical network configuration specifies the optional mapping of each logical port to a physical port (e.g., hardware or software port) on a transport node, or the logical connection to another logical port with a logical link. Such mappings are arbitrary, i.e. the logical network topology, the physical locations of concrete ports, and the physical network topology are completely independent.

Figure 2:
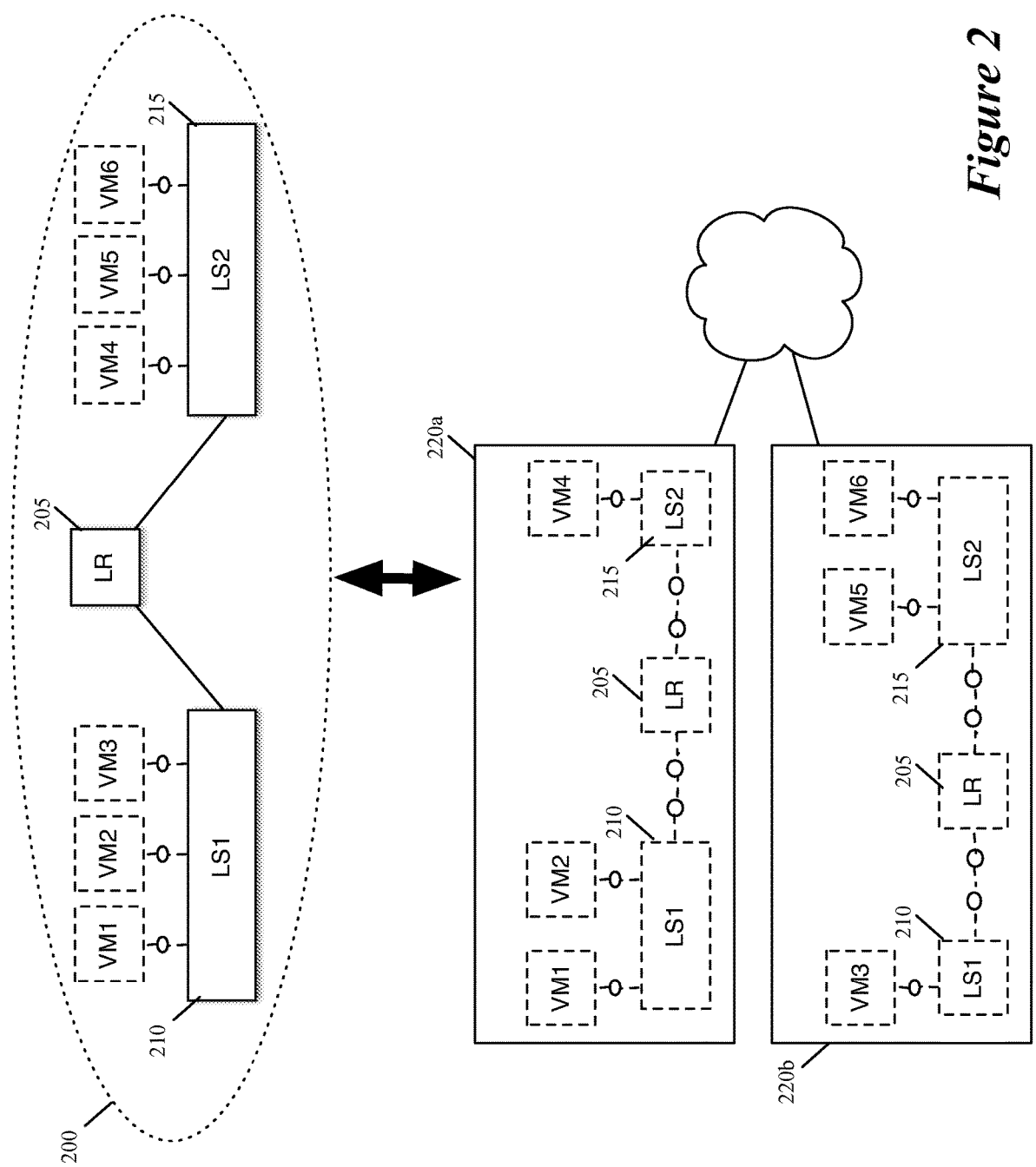
FIG. 2 illustrates an example of a logical network that has its logical router and two logical switches distributed to two different host computing devices that execute the VMs of the logical network.

In addition, the instantiation of a logical network entity can be distributed by the logical networking system to multiple transport nodes, i.e., a logical network entity may not be located on a single node. For instance, the instantiation of a logical switch can be distributed to all the transport nodes where its logical ports are mapped to virtual machine interfaces or physical interfaces. The instantiation of a logical router can be distributed to all the transport nodes where all the logical switches it is logically connected to are instantiated. Likewise, the instantiation of a logical router port can be distributed to all the transport nodes where the logical switch it is connected to is instantiated. FIG. 2 illustrates an example of a logical network 200 that has its logical router 205 and logical switches 210 and 215 distributed to two different host computing devices 220 that execute the VMs of the logical network.

In some embodiments, logical forwarding elements (also called logical network entities) are implemented on a transport node by programming one or more managed forwarding elements (e.g., a programmable switch) on the transport node. The MFE on transport nodes can be implemented in hardware, if the transport node is a physical network equipment, or as a software forwarding element (e.g., an OVS (Open vSwitch) switch) that executes on a host computing device with one or more virtual machines.

In some embodiments, the managed forwarding element is programmed using an MFE programming interface, which can be either an API or a protocol such as OpenFlow. In some embodiments, the MFE interface allows the logical network system's control plane to program flow tables that specify, for each flow: (1) a set of matching criteria, which specifies the pattern of packets matching that flow in terms of elements of packet headers at Layers 2 to 7, and (2) actions to be performed on packets in the flow. Possible actions include outputting the packets to a specified port, and modifying packet header elements.

In some embodiments, the logical network configuration is translated into flow tables in all transport node MFEs to perform the packet processing equivalent to that of the physical network equipment that are simulated by the logical network's topology. The MFE interface also supports configuring the MFE for exporting monitoring information. In some embodiments, this is implemented by using the OVSDB protocol.

On one hand, the distributed nature of network virtualization (i.e., the instantiation of the logical network entities on many transport nodes) makes monitoring more challenging, as many transport nodes may have to be monitored to monitor a single logical network entity. On the other hand, the centralized control of the whole logical network, and the precise centralized control of each managed forwarding element (through the controller nodes 115) on each transport node, provides more control and visibility into the network than physical networks, which are decentralized by their very nature.

As mentioned above, some embodiments allow a user to define one or more logical network probes to gather logical network traffic for monitoring. The logical network configuration in some embodiments includes logical network probes. In some embodiments, the logical network probes are translated into sample-action flow entries for the flow tables of the managed forwarding elements that are associated with the logical observation points that are connected to the logical network probe. As mentioned above, and further described below, sample-action flow entries cause the managed forwarding elements to sample logical-network packets, so that the sampled logical-network data can be relayed to one or more data collectors 175.

Figure 3:
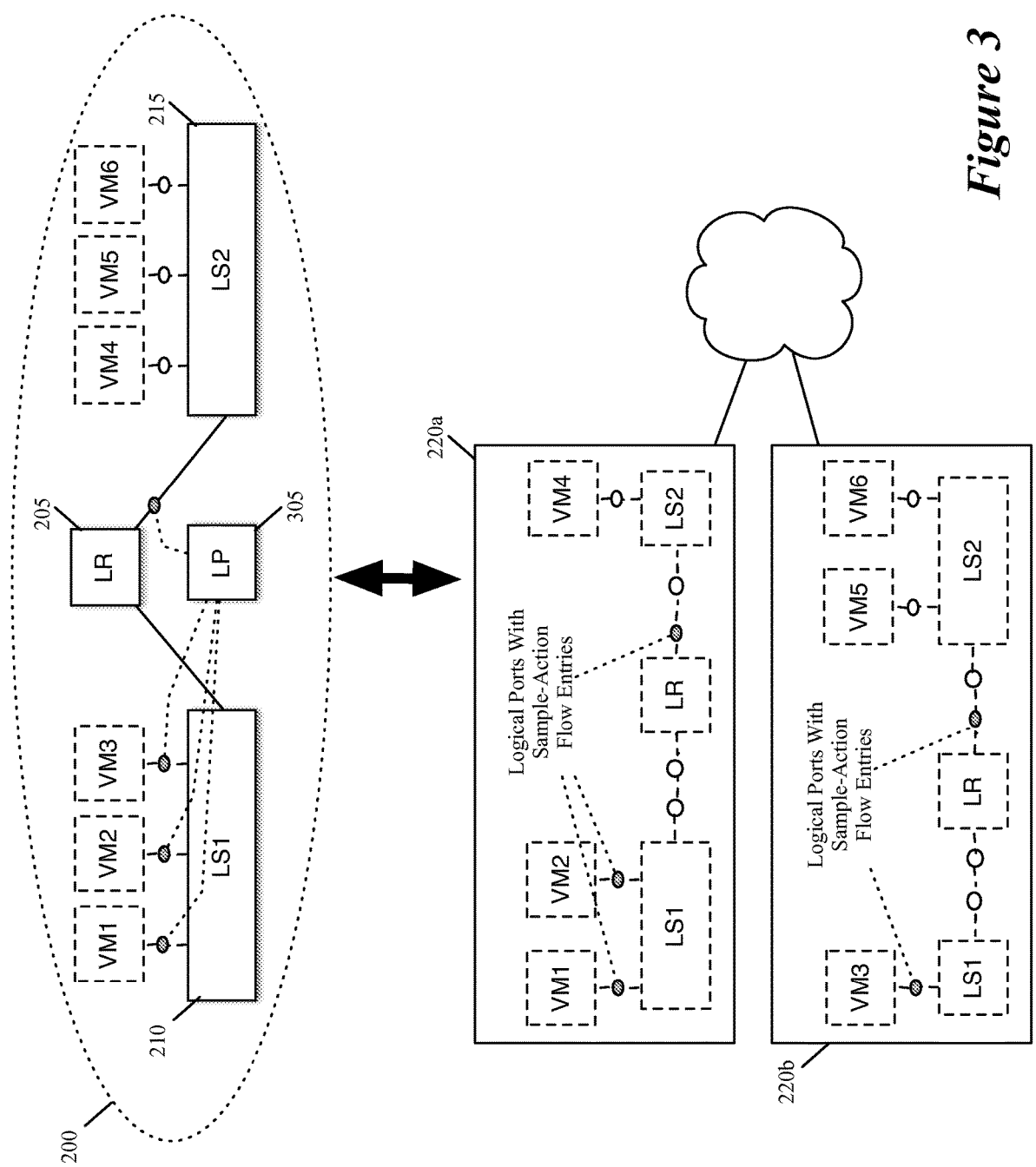
FIG. 3 illustrates an example of a set of logical observation points that are associated with a logical network probe.

In some embodiments, logical network probes are configured by users via the control nodes' API to observe and monitor packets at any set of logical observation points in the logical network. Any number of logical network probes can be created, reconfigured, and destroyed by a user at any time. In some embodiments, each logical network probe has a unique identifier in the whole logical networking system. A single logical network entity can be probed by one or more logical network probes, each with a different configuration. Also, in some embodiments, different logical network entities can be configured and probed at different observation points. Examples of such logical network entities, and their different observation points, in some embodiments include:
- an ingress logical port;
- an egress logical port;
- all ingress ports of a logical switch;
- all egress ports of a logical switch;
- all ingress ports of a logical router;
- all egress ports of a logical router;
- all ingress ports of all logical switches;
- all egress ports of all logical switches;
- all ingress ports of all logical routers;
- all egress ports of all logical routers;
- all ingress ports of all logical equipment;
- all egress ports of all logical equipment;
- a NAT rule at ingress;
- a NAT rule at egress;
- a firewall rule at ingress;
- traffic accepted by a logical firewall rule;
- traffic dropped by a logical firewall rule;
- traffic rejected by a logical firewall rule;
- a logical firewall at ingress;
- a logical firewall at egress;
- traffic accepted by a logical firewall;
- traffic dropped by a logical firewall;
- traffic rejected by a logical firewall;

FIG. 3 illustrates an example of a set of logical observation points that are associated with a logical network probe 305. In this example, the observation points are the ports of logical switch 210 that connect to VM1, VM2 and VM3, and the port of the logical router 205 that connects to the logical switch 215. As shown, sample-action flow entry data is defined and pushed to the computing devices 220 for these ports. In some embodiments, the distributed sample-action flow entry data includes a set of sample-action flow entries. In other embodiments, the distributed sample-action flow entry data is data that allows the set of managed forwarding elements to produce sample-action flow entries. In some embodiments, each sample-action flow entry has the logical network probe identifier and a set of matching criteria, and the distributed sample-action flow entry data includes this information.

In the example illustrated in FIG. 3, the sample flow entries cause the software forwarding elements that execute on the computing devices 220 to sample the packets that match the flow matching criteria and pass through these ports (i.e., the ports of the logical switch 210, and the logical router port that connects to logical switch 215) at the desired sampling percentage. In some embodiments, this sample data is forwarded directly to the set of data collectors 175 with the logical network probe's identifier. In other embodiments, this sample data is first aggregated and analyzed by a process executing on the forwarding element or the host, before this process supplies analysis data regarding this sample data to the data collector set 175. Once gathered at the data collector set, the data can be aggregated and analyzed in order to produce data, graphs, reports, and alerts regarding the specified logical network probe.

In some embodiments, one managed forwarding element that executes on a host computing device can implement multiple different logical forwarding elements of the same or different types. For instance, for the example illustrated in FIG. 3, one software switch in some embodiments executes on each host, and this software switch can be configured to implement the logical switches and the logical routers of one or more logical networks. In other embodiments, one managed forwarding element that executes on a host computing device can implement multiple different logical forwarding elements but all the MFEs have to be of the same type. For instance, for the example illustrated in FIG. 3, two software forwarding elements execute on each host, one software forwarding element can be configured to implement the logical switches of one or more logical networks, while the other software forwarding element can be configured to implement the logical routers of one or more logical networks.

In some embodiment, the managed forwarding elements at logical observation points can be configured to export monitoring statistics about observed flows to flow statistics collectors connected to the physical network or the logical network, using protocols such as sFlow, IPFIX, and NetFlow. Also, in some embodiment, the managed forwarding elements at logical observation points can be configured to export sampled packets to collectors connected to the physical network or the logical network, using protocols such as sFlow and PSAMP/IPFIX. In some embodiments, a logical network probe performs monitoring through statistical sampling of packets at a logical observation point.

In some embodiments, the configuration of each logical network probe (via the control nodes' API) includes (1) set of logical network entities to probe, (2) protocol to use to interact with collectors, (3) collectors' network addresses and transport ports, (4) packet sampling probability, and (5) protocol-specific details (e.g. for IPFIX, active timeout, idle timeout, flow cache size, etc.).

To support configuring the flow monitoring statistics export for each logical network probe instantiated on a transport node, the transport nodes' MFE configuration interface is extended in some embodiments to include (1) a protocol to use to interact with collectors, (2) collectors' network addresses and transport ports, and (3) protocol-specific details (e.g. for IPFIX protocol, active timeout, idle timeout, flow cache size, etc.). As mentioned above, each logical network probe configuration on the switch is identified with the probe's unique identifier.

As mentioned above, a new type of action, called sample action, is added to the interface offered by the transport nodes' MFE, in order to sample logical network flow data at logical observation points in the network that are associated with the user-defined logical network probes. In some embodiments, each sample action flow entry contains three sets of parameters, which are (1) one or more matching criteria that specify the flows that match the sample action, (2) a packet sampling probability that specifies a percentage of packets that should be sampled in the matching flow, and (3) a logical network probe identifier. In some embodiments, the sample action flow entry also includes (1) the type of data to sample, and (2) the location to send the sampled data. In other embodiments, the type of data to sample and the location for sending the sample data are defined by the logical network configuration or some other configuration of the managed forwarding element.

A logical network probe can sample an arbitrary number of logical entities. In some embodiments, a logical network probe is instantiated by probe configurations and sample actions inserted into flows on many transport nodes. Each of the transport nodes instantiating a logical network probe sends monitoring traffic directly to the configured collectors. A logical network probe's unique identifier is sent in the monitoring protocol messages to collectors, in a way specific to each protocol. This identifier can be used by collectors to differentiate the monitoring statistics received from a single transport node for multiple probes instantiated on the node, and to aggregate the statistics received from multiple transport nodes for a single probe instantiated on multiple nodes. In an embodiment, the IPFIX protocol is used to send to collectors flow records containing the probe's unique identifier in the standard "observation point ID" element.

Figure 4:
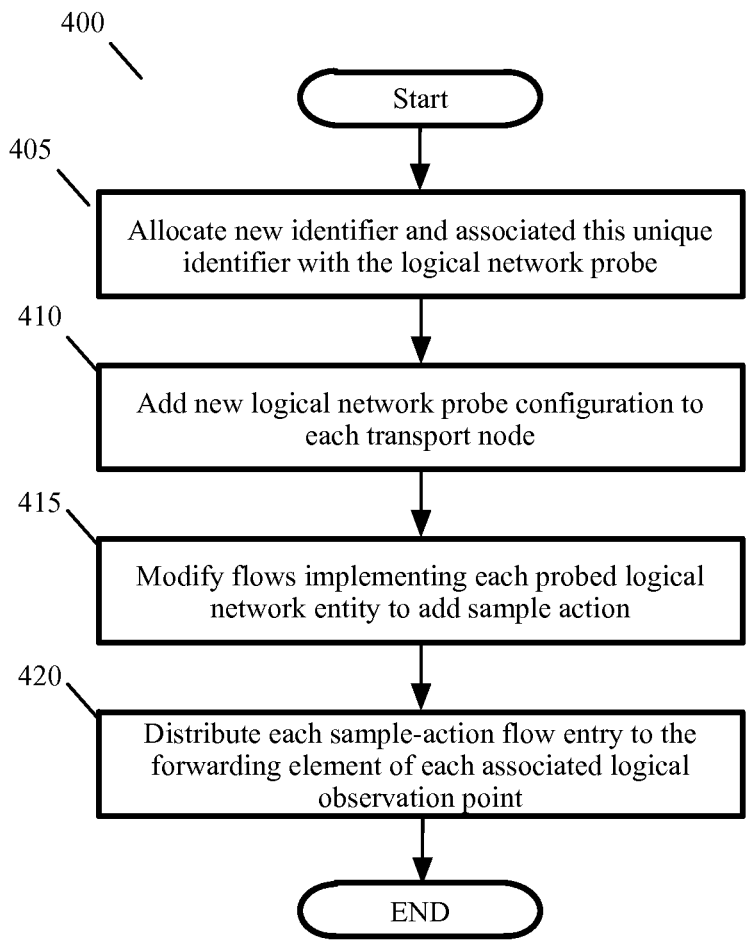
FIG. 4 illustrates a process that a controller performs to configure a logical network probe.

FIG. 4 illustrates a process 400 that a controller 115 performs to configure a logical network probe. This process is performed when a logical network probe is created by a user via the control nodes' API. As shown, the process initially (at 405) allocates a new unique identifier for the network probe that is defined by the user. Next, at 410, the process adds a new logical network probe configuration to the control plane of each transport node MFE that implements the logical network entities that have the logical observation points that are associated with the defined logical network probe. In some embodiments, the process adds the logical network probe configuration through each affected transport node's MFE configuration interface.

To add (at 410) the logical network probe configuration to each affected MFE (i.e., each transport node MFE that implements the logical network entities that have the logical observation points that are associated with the defined logical network probe), the process has to identify the transport node MFEs that include the logical observation points that are associated with the defined logical network probe. In some embodiments, the logical observation points can be any ingress or egress port of a logical forwarding element (e.g., a logical switch or logical router), or can be at any decision making point in the logical processing pipeline (e.g., at a firewall rule resolution or network address translation point in the logical processing pipeline) for processing packets received from a data compute node (e.g., a virtual machine, computer, etc.). Also, one logical observation point might be exist as multiple points in one or more transport nodes. For instance, the logical port between the logical router 205 and the logical switch 215 in FIG. 3 appears as two points on the two host computing devices 220.

At 415, the process 400 modifies flow entries that implement each probed logical network entity to add sample actions, which contain the probe's sampling probability and unique identifier. The process sends (at 420) modified flow entry data to the managed forwarding elements of each transport node that executes or includes the logical network entities that have the logical observation points that are associated with the defined logical network probe. The specific flows that are modified to include sample actions are specific to each logical network entity type, and the specific implementation of the logical networking system. The flows implementing a logical network entity can contain multiple sample actions, and possible actions with different logical network probe identifiers if the entity is probed by multiple probes.

In some embodiments, the distributed sample-action flow entry data includes a set of sample-action flow entries. In other embodiments, the distributed sample-action flow entry data includes data that allows the set of managed forwarding elements to produce sample-action flow entries. In some embodiments, each sample-action flow entry has the logical network probe identifier and a set of matching criteria, and the distributed sample-action flow entry data includes this information. In some embodiments, the network controllers distribute the sample-action flow entries through control channel communication with the MFEs that implement the logical network entities that are associated with the logical observation points of a logical network probe. One or more control plane modules of the MFEs then use the control channel data that the MFEs receive to produce data plane representation of the flow entries, which these modules then push into the data plane of the MFEs, as further described below by reference to FIG. 9. After 420, the process 400 ends.

Figure 5:
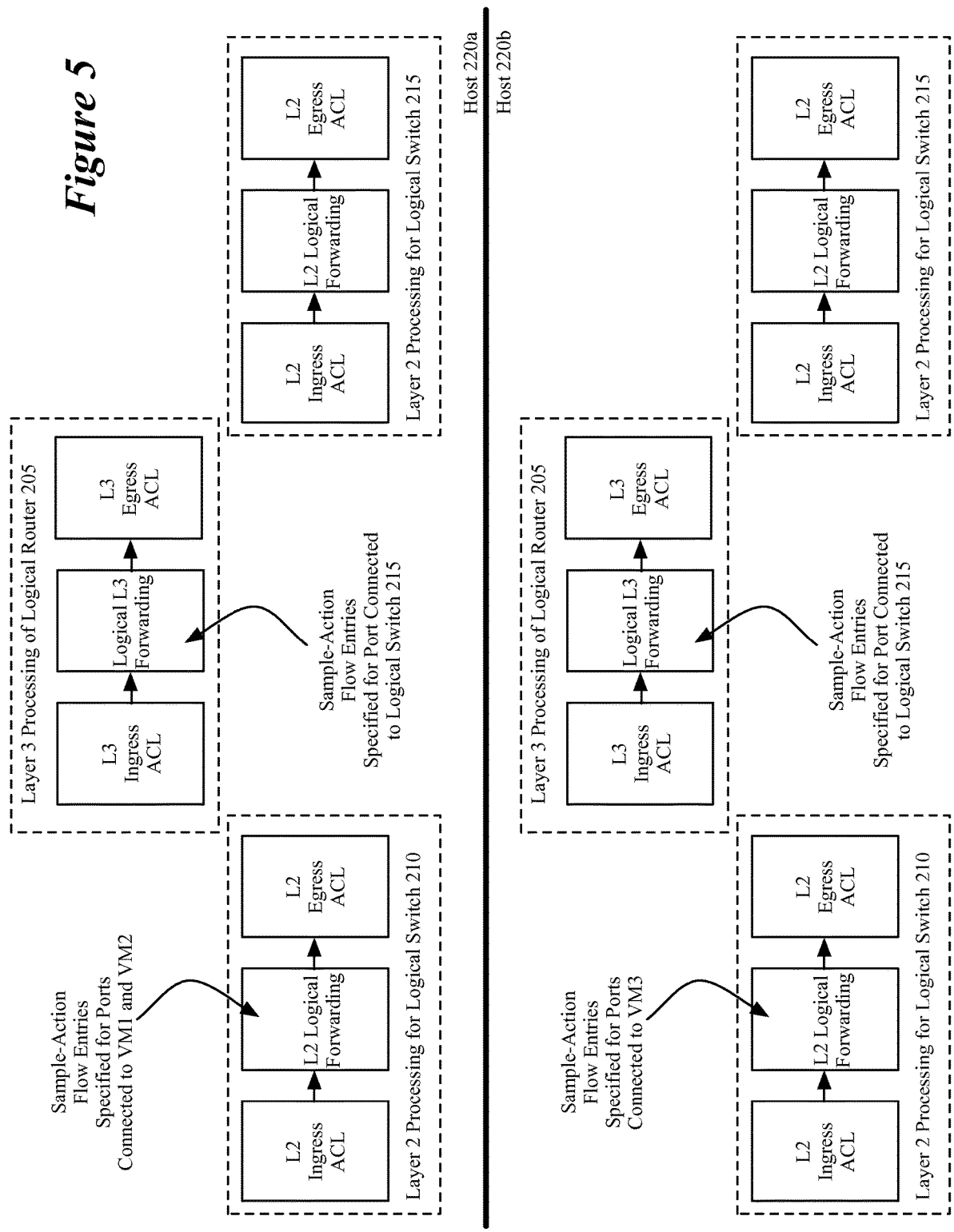
FIG. 5 illustrates an example of how the sample-action flow entries that are distributed get implemented in some embodiments.

FIG. 5 illustrates an example of how the sample-action flow entries that are distributed get implemented in some embodiments. Specifically, for the logical probe of FIG. 3, FIG. 5 illustrates the location where the sample-action flow entries are inserted in the flow tables of the software forwarding elements that execute on the hosts 220a and 220b. As shown in FIG. 5, each logical switch includes an L2 ingress ACL table, an L2 logical forwarding table, and an L2 egress ACL table, while the logical router includes an L3 ingress ACL table, an L3 logical forwarding table, and an L3 egress ACL table. Each of these sets of tables are processed by one managed forwarding element on each host 220 in some embodiments, while each of these sets of tables are processed by two managed forwarding elements on each host 220 (one for the processing the logical switching operations, and another for processing the logical routing operations) in other embodiments.

As further shown in FIG. 5, the logical probe 305 in some embodiments is implemented by inserting sample-action flow entries in the L2 logical forwarding table of the logical switch 210 on both devices 220a and 220b. However, on the device 220a, the sample-action flow entries are specified in terms of the forwarding element ports that connect to VM1 and VM2, while on the device 220b, the sample-action flow entry is specified in terms of the forwarding element port that connects to VM3. On both devices, the L3 logical forwarding table of the logical router 205 has a sample-action flow entry for the logical probe 305 and this sample-action flow entry is specified in terms of the logical router's logical port that connects to the logical switch 215.

In some embodiments, a flow entry (including a sample action flow entry) is specified in terms of a set of matching criteria and an action. To process a flow entry for a packet, the forwarding element compares the packet's attribute set (e.g., header values) against the flow entry's matching criteria set, and performs the flow entry's action when the packet's attribute set matches the flow entry's matching criteria set. When the logical processing pipeline has multiple flow entry tables (such as ingress/egress ACL tables, and L2/L3 tables), and each of these tables has multiple flow entries, the forwarding element may examine multiple flow entries on multiple table to process a packet in some embodiments.

Figure 6:
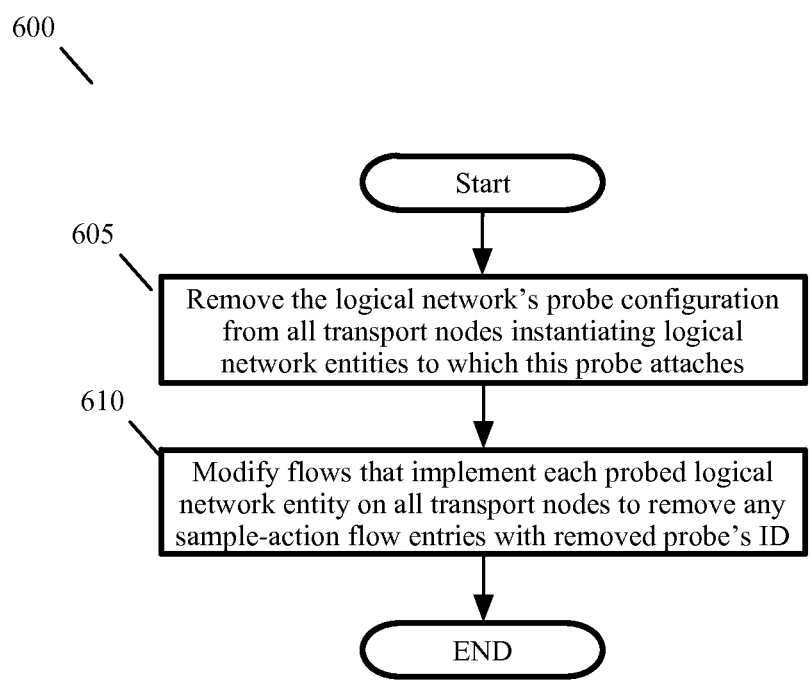
FIG. 6 illustrates a process that some embodiments perform when a logical network probe is destroyed.

FIG. 6 illustrates a process 600 that some embodiments perform when a logical network probe is destroyed (e.g., via user input that is received through the control nodes' API). As shown, the process initially removes (at 605) the logical network probe's configuration from the control plane of all transport nodes that instantiate the logical network entities probed by this probe. In some embodiments, the configuration is removed via each affected transport node's MFE configuration interface. Next, the process modifies (at T10) the flow entries that implement each probed logical network entity to remove any sample action containing the probe's unique identifier. To do this, the process in some embodiments directs each affected MFE, through the MFE's control plane interface, to remove sample actions flow entries that contain the probe's identifier. After 610, the process ends.

Figure 7:
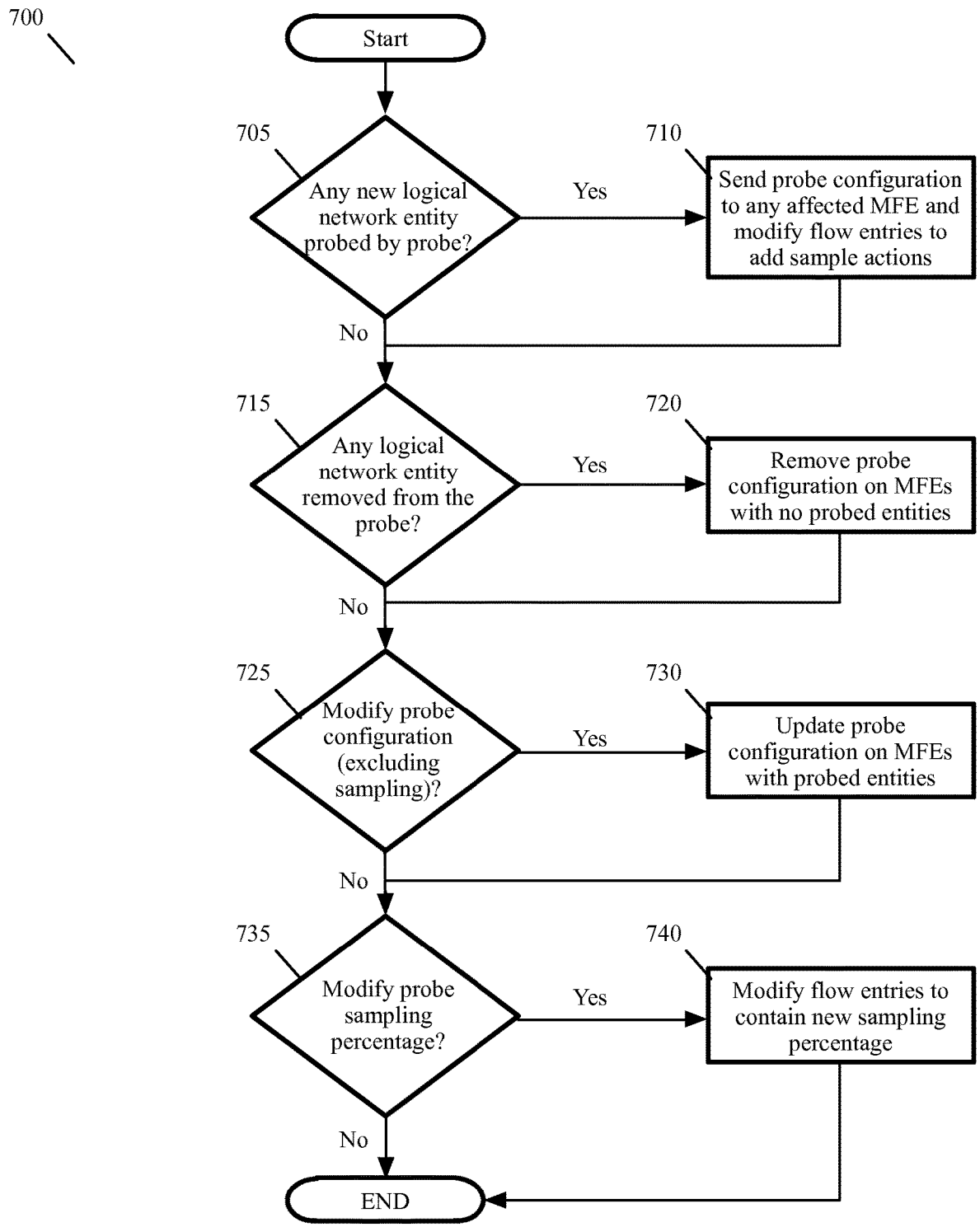
FIG. 7 illustrates a process that some embodiments perform when a logical network probe is reconfigured.

FIG. 7 illustrates a process 700 that some embodiments perform when a logical network probe is reconfigured (e.g., via user input that is received through the control nodes' API). As shown, the process initially determines (at 705) whether the logical network probe reconfiguration adds any new logical network entity to the set of entities probed by the logical network probe. If not, the process transitions to 715, which will be described below. Otherwise, the process (at 710) sends the logical network probe configuration to any MFE that implements the newly added logical network entity, if the MFE did not already have the logical network probe configuration by virtue of implementing another logical network entity associated with the logical network probe. As mentioned above, the probe's configuration is added to an MFE through control plane communication in some embodiments. At 710, the process also directs the MFEs that implement any newly added logical network entity with the logical observation points of the logical network probe, to modify their flow entries to include sample action flow entries. After 710, the process transitions to 715.

At 715, the process determines whether the logical network probe reconfiguration removes any logical network entity removed from the set of probed entities. If not, the process transitions to 725, which will be described below. Otherwise, the process transitions to 720, where it removes the probe's configuration from all MFEs on transport nodes where no entities are probed anymore. The probe's configuration is removed from an MFE through control plane communication in some embodiments. The probe's configuration remains on MFEs on transport nodes where probed entities are still instantiated. After 720, the process transitions to 725.

At 725, the process determines whether the logical network probe reconfiguration modifies any of the probe's configuration excluding the probe's sampling probability. If not, the process transitions to 735, which will be described below. Otherwise, the process updates (at 730) the probe's configuration on all MFEs on all transport nodes where probed entities are instantiated. The probe's configuration is updated on an MFE through control plane communication in some embodiments. After 730, the process transitions to 735.

At 735, the process determines whether the logical network probe reconfiguration modifies the probe's sampling probability. If not, the process ends. Otherwise, the process directs (at 740) the MFEs implementing each probed logical network entities to modify all sample actions containing the probe's identifier, to contain the probe's new sampling probability. The sampling probability is adjusted in some embodiments through control plane communication with the MFEs that implement the logical network probe. In some embodiments, the control channel communication provides new sample-action flow entries with new sampling probabilities, while in other embodiments, the control channel communication provides instructions to the MFE to modify the probabilities in the sample-action flow entries that the MFE already stores. After 740, the process ends.

Figure 8:
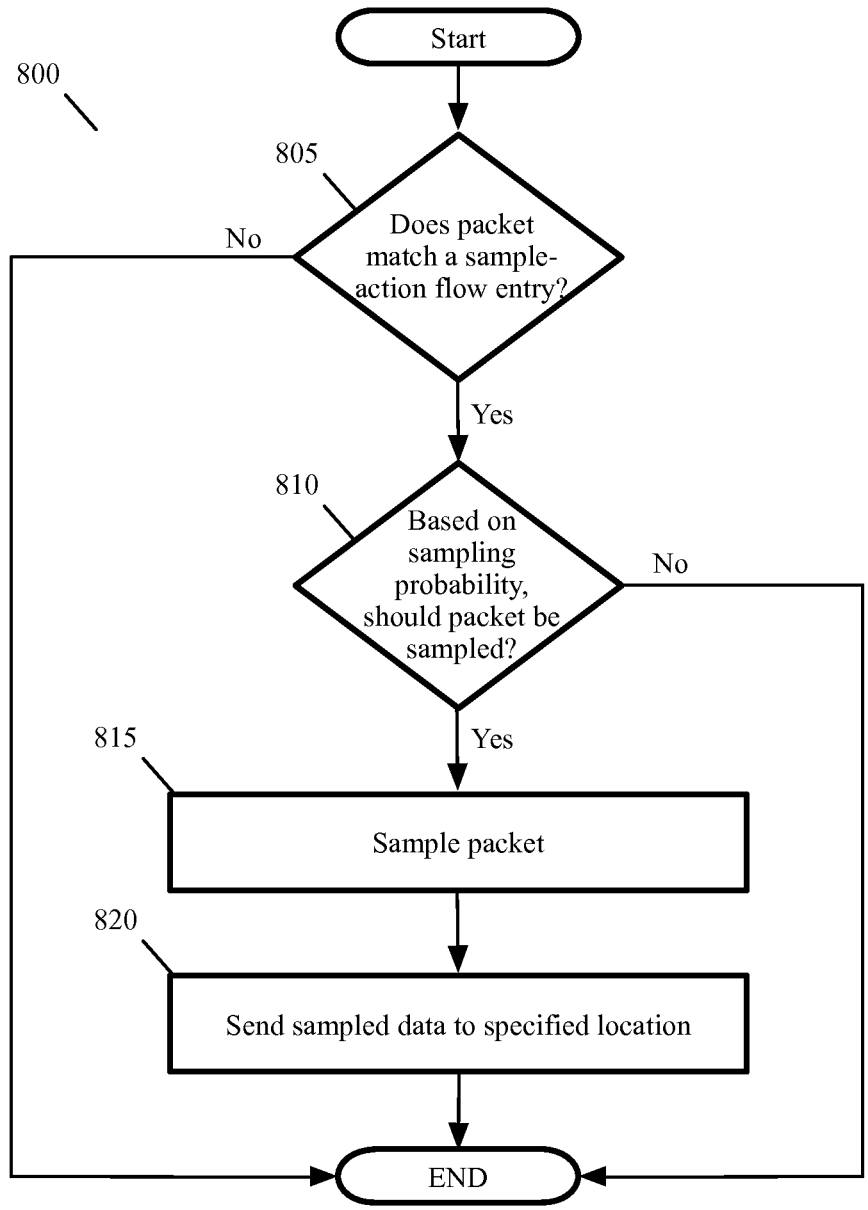
FIG. 8 presents a process that conceptually illustrates the operation that a managed forwarding element performs to process a sample-action flow entry.

As mentioned above, the network controller set distributes sample-action flow entry data for a logical probe to the forwarding element that is supposed to process the sample-action flow entry for one of the logical probe's logical observation point. The sample-action flow entry causes the forwarding element to sample packets at the logical observation points based on a set of matching criteria and based on a sampling probability. To illustrate this, FIG. 8 presents a process 800 that conceptually illustrates the operation that a managed forwarding element performs to process a sample-action flow entry.

As shown, this process initially determines (at 805) whether a packet matches a sample-action flow entry, by determining whether the packet header attributes (e.g., based on L2 or L3 packet header attributes) matches the flow entry's set of matching criteria. The matching criteria set of each sample-action flow entry defines the types of packet flows that are candidates for sampling for the logical network probing. If the packet's header attributes do not match the flow entry's matching criteria set, the process ends.

Otherwise, the process determines (at 810) whether it should sample the packet because, in some embodiments, not all the packets that satisfy the matching criteria set will have to be sampled. As mentioned above, the matching criteria set includes a user-definable sampling percentage criteria, which causes the forwarding element to only sample a certain percentage of the packets that satisfy the other matching criteria. To resolve the decision at 810, the process randomly selects a number between 0 and 100 (inclusive of 0 and 100), and determines whether this number is equal to or less than the sampling percentage. If so, the process determines that it should sample the packet. Otherwise, the process determines that it should not sample the packet.

When the process determines (at 810) that it should not sample the packet, it ends. Otherwise, the process samples (at 815) the packet, sends (at 820) the sampled data to a specified location, and then ends. In some embodiments, the sampled data includes the entire packet, while in other embodiments, the sample data includes a portion (e.g., payload) of the packet and/or metadata regarding the packet. In some embodiments, the sample-action flow entry specifies a location for the forwarding element to send data about the sample packet (e.g., the sample packet itself and metadata associated with the sample packet), while in other embodiments, this location is specified by the logical network probe configuration data that the MFE receives or by other configuration data of the MFE.

In some embodiments, the location that the sample-action flow entry sends its sample data is a daemon of the forwarding element that (1) gathers sample action data for one or more logical observation points on the forwarding element, and (2) forwards the collected data periodically or in real time to one or more data collectors in a set of data collectors (e.g., one or more servers) that collect and analyze logical network probe data from various forwarding elements. One example of such a daemon is a daemon of an OVS software switching element of some embodiments of the invention. This daemon will be further described below by reference to FIG. 9.

In some embodiments, an exporter process in the daemon maintains a flow cache containing data aggregated from the data received from the sample-action flow entry. The flow cache data is aggregated by flows, i.e. all data received for packets in a given same flow are aggregated into the same flow cache entry. Flow cache entries may optionally include packet header elements identifying the flow (e.g. the IP source and destination address, protocol number, and source and destination transport ports), as well as aggregated statistics about the flow (e.g. the timestamps of the first and last sampled packets in the flow, the number of sampled packets, and the number of sampled bytes). Data from the flow cache entries is extracted from the cache and sent to collectors by the exporter process, depending on its caching policy.

In some embodiments, the logical network probe configuration data sent to the MFE contains parameters to configure the exporter process's caching policy. Those parameters may include the set addresses of collectors to send aggregated flow data to, and parameters controlling the maximum period to cache each flow cache data tuple before sending it to collectors. Flow caching parameters may include an active timeout, i.e. the maximum time period a flow cache entry can remain in the flow cache since its first packet was sampled, an idle timeout, i.e. the maximum time period a flow cache entry can remain in the flow cache after its last packet was sampled, and a maximum number of flow entries in the cache.

In some embodiments, the location that the sample-action flow entry sends its sample data is a data collector. In other words, the sample-action flow entry in some embodiments directs the forwarding element to send the sample packet data directly to the set of data collectors. In some embodiments, some sample-action flow entries send the sample-packet data to the MFE daemon, while other sample-action flow entries send the sample-packet data directly to the data collector set.

When the forwarding element forwards the sample-packet data to the location specified in the sample-action flow entry, the forwarding element also forwards the logical network probe identifier that is specified in the sample-action flow entry. The MFE daemons and the data collectors use the logical network probe identifiers to aggregate and/or analyze the data that they receive for the logical network probes. For instance, the logical network probe identifier can be used by collectors to differentiate the monitoring statistics received from a single forwarding element for multiple probes defined on the forwarding element, and to aggregate the statistics received from multiple forwarding elements for a single probe instantiated on multiple forwarding element.

Figure 9:
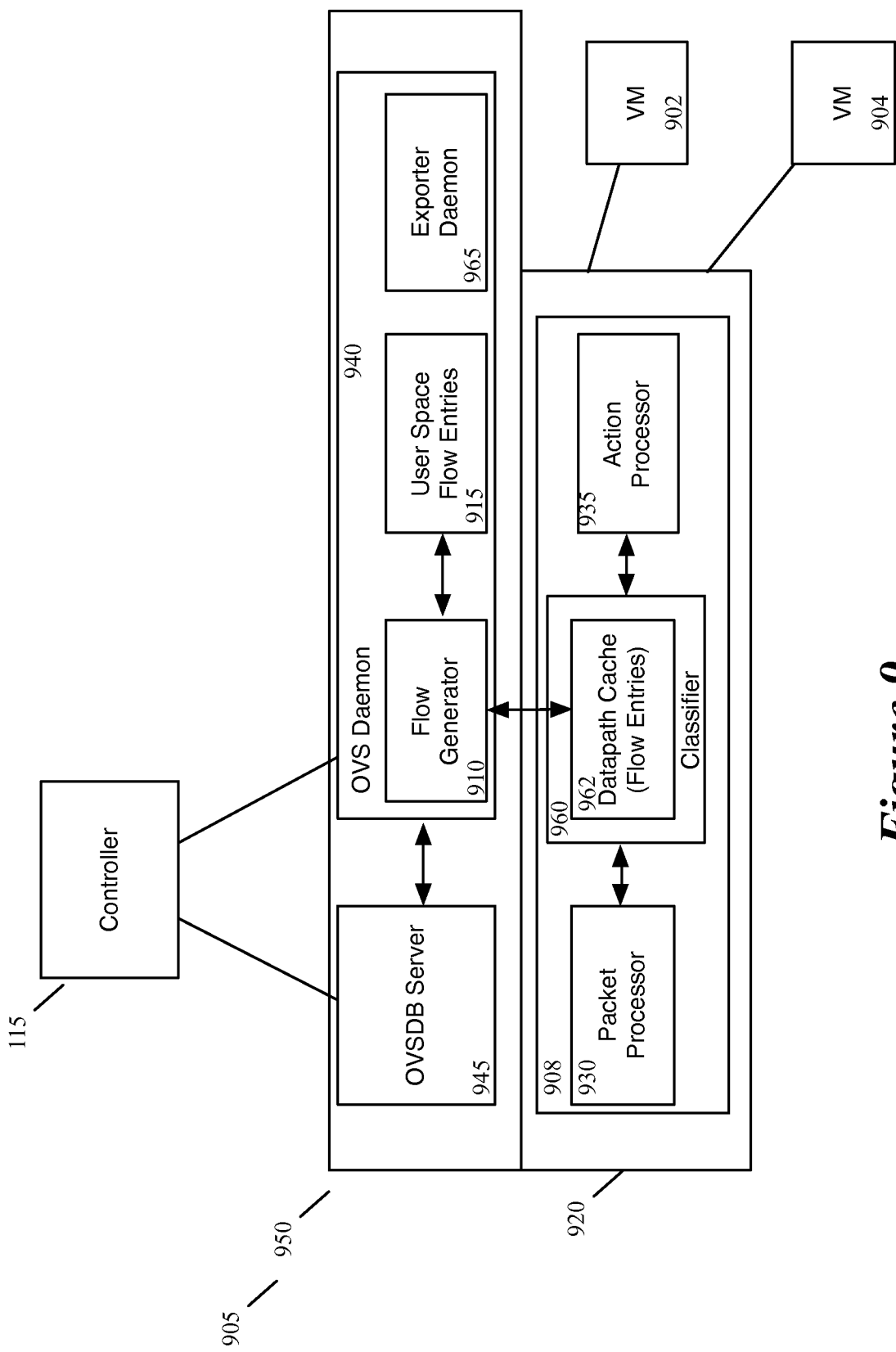
FIG. 9 conceptually illustrates a software-switching element of some embodiments that is implemented in a host computing device.

FIG. 9 conceptually illustrates a software-switching element 905 of some embodiments that is implemented in a host computing device. In this example, the software-switching element 905 includes (1) an Open vSwitch (OVS) kernel module 920 with a bridge 908 in a hypervisor kernel space, and (2) an OVS daemon 940 and an OVS database server 945 in the hypervisor user space 950. The hypervisor is a software abstraction layer that runs either on top of the host's operating system or on bare metal (just on top of the host's hardware). In this example, two VMs 902 and 904 execute on top of the hypervisor and connect to the kernel module 920, as further described below. In some embodiments, the user space 950 and kernel space 920 are the user space and kernel space of a dom 0 (domain 0) VM that executes on the hypervisor.

As shown, the user space 950 includes the OVS daemon 940 and the OVS database server 945. The OVS daemon 940 is an application that runs in the background of the user space. This daemon includes a flow generator 910, user space flow entries 915, and an exporter daemon 965. In some embodiments, the OVS daemon 940 communicates with the network controller using OpenFlow Protocol. The OVS daemon 940 of some embodiments receives switch configuration from the network controller 115 (in a network controller cluster) and the OVS database server 945. The management information includes bridge information, and the switch configuration includes various flows. These flows are stored in a flow table 915 of the OVS daemon 940. Accordingly, the software-switching element 905 may be referred to as a managed forwarding element.

In some embodiments, the exporter daemon 965 receives sample data from the bridge 908, aggregates this data, analyzes this data, and forwards the analyzed data periodically to one or more data collectors. For instance, for each sampled flow, the exporter daemon analyzes multiple sample data sets to produce the following data tuple for reporting to the data collector set 175: flow's five tuple, packet count, byte count, start timestamp, and end time stamp. In other embodiments, the exporter daemon 965 relays the sample data in real time to one or more data collectors.

In some embodiments, the OVS database server 945 communicates with the network controller 115 and the OVS daemon 940 through a database communication protocol (e.g., OVSDB (OVS database) protocol). The database protocol of some embodiments is a JavaScript Object Notation (JSON) remote procedure call (RPC) based protocol. The OVS database server 945 is also an application that runs in the background of the user space. The OVS database server 945 of some embodiments communicates with the network controller 115 in order to configure the OVS switching element (e.g., the OVS daemon 940 and/or the OVS kernel module 920). For instance, the OVS database server 945 receives management information from the network controller 115 for configuring the bridge 908, ingress ports, egress ports, QoS configurations for ports, etc., and stores the information in a set of databases.

As illustrated in FIG. 9, the OVS kernel module 920 processes and routes network data (e.g., packets) between VMs running on the host and network hosts external to the host (i.e., network data received through the host's NICs). For example, the OVS kernel module 920 of some embodiments routes packets between VMs running on the host and network hosts external to the host coupled the OVS kernel module 920 through the bridge 908.

In some embodiments, the bridge 908 manages a set of rules (e.g., flow entries) that specify operations for processing and forwarding packets. The bridge 908 communicates with the OVS daemon 940 in order to process and forward packets that the bridge 908 receives. For instance, the bridge 908 receives commands, from the network controller 115 via the OVS daemon 940, related to processing and forwarding of packets.

In the example of FIG. 9, the bridge 908 includes a packet processor 930, a classifier 960, and an action processor 935. The packet processor 930 receives a packet and parses the packet to strip header values. The packet processor 930 can perform a number of different operations. For instance, in some embodiments, the packet processor 930 is a network stack that is associated with various network layers to differently process different types of data that it receives. Irrespective of all the different operations that it can perform, the packet processor 930 passes the header values to the classifier 960.

The classifier 960 accesses the datapath cache 962 to find matching flows for different packets. The datapath cache 962 contains any recently used flows. The flows may be fully specified, or may contain one or more match fields that are wildcarded. When the classifier 960 receives the header values, it tries to find a flow or rule installed in the datapath cache 962. If it does not find one, then the control is shifted to the OVS daemon 940, so that it can search for a matching flow entry in the user space flow entry table 915.

If the classifier 960 finds a matching flow, the action processor 935 receives the packet and performs a set of action that is associated with the matching flow. The action processor 935 of some embodiment also receives, from the OVS daemon 940, a packet and a set of instructions to perform on the packet. For instance, when there is no matching flow in the datapath cache 962, the packet is sent to the OVS daemon 940. In some embodiments, the OVS daemon 940 can generate a flow and install that flow in the datapath cache 962. The OVS daemon 940 of some embodiments can also send the packet to the action processor 935 with the set of actions to perform on that packet.

In some embodiments, the action processor 935 performs the sampling associated with a sample-action flow entry that is stored in the user space entries 915 or the datapath cache

962. After performing this sampling, the action processor 935 sends the sampled data to a location that is identified (1) in the sample action flow entry in some embodiments, (2) in the logical network probe configuration stored by the switch 905 in other embodiments, or (3) in some other configuration storage of the switch 905 in still other embodiments. In some embodiments, this location is the exporter daemon 965 of the forwarding element for some or all of the sample-action flow entries. As mentioned, the exporter daemon relays the sample data it receives in real time to the data collector set in some embodiments, while this daemon analyze this data with other similar sample data to produce analysis data that it provides periodically to the data collector set in other embodiments. In some embodiments, the action processor 935 sends the sampled data directly to the data collector set for some or all of the sample-action flow entries.

The OVS daemon 940 of some embodiments includes a datapath flow generator 910. The datapath flow generator 910 is a component of the software switching element 905 that makes switching decisions. Each time there is a miss in the datapath cache 962, the datapath flow generator 940 generates a new flow to install in the cache. In some embodiments, the datapath flow generator works in conjunction with its own separate classifier (not shown) to find one or more matching flows from a set of one or more flow table 915. However, different from the classifier 960, the OVS daemon's classifier can perform one or more resubmits. That is, a packet can go through the daemon's classifier multiple times to find several matching flows from one or more flow table 915. When multiple matching flows are found, the datapath flow generator 910 of some embodiments generates one consolidated flow entry to store in the datapath cache 962.

Figure 10:
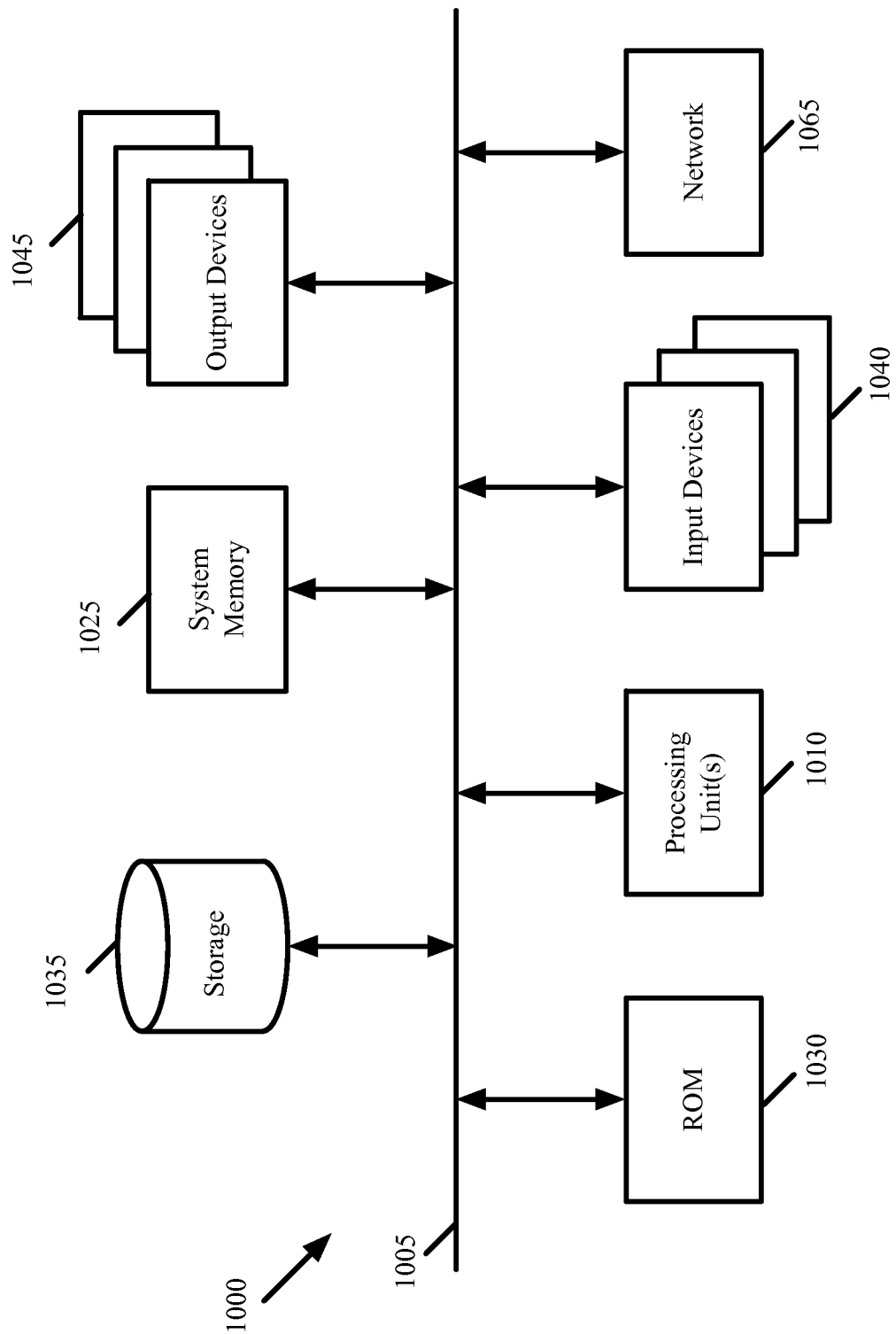
FIG. 10 conceptually illustrates an electronic system with which some embodiments of the invention are implemented.

FIG. 10 conceptually illustrates an electronic system 1000 with which some embodiments of the invention are implemented. The electronic system 1000 may be a computer (e.g., a desktop computer, personal computer, tablet computer, server computer, mainframe, a blade computer etc.), or any other sort of electronic device. This electronic system can be the network controller or a host computing device that executes some embodiments of the invention. As shown, the electronic system includes various types of computer readable media and interfaces for various other types of computer readable media. Specifically, the electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035. From these various memory units, the processing unit(s) 1010 retrieve instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such a random access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer or electronic device. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, this specification refers throughout to computational and network environments that include virtual machines (VMs). However, virtual machines are merely one example of data compute nodes (DNCs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc. One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

Also, a number of the figures (e.g., FIGS. 4, 6, 7, and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Therefore, one of ordinary skill in the art would understand that the invention is not to be limited by the foregoing illustrative details, but rather is to be defined by the appended claims.

What is claimed is:

1. A method of gathering data for performing traffic analysis between data compute nodes (DCNs) executing on host computers in a datacenter and associated with a logical network connecting the DCNs, the method comprising:
   at a particular managed forwarding element (MFE) executing on a particular host computer to implement a logical network along with a set of one or more MFEs executing on a set of one or more other host computers, receiving a data packet associated with the logical network;
   processing the packet according to a logical processing pipeline for the logical network, the logical processing pipeline including a sample-action flow entry;
   based on the data packet matching the sample-action flow entry, sending information regarding the data packet to a data collector that receives information regarding data packets for the logical network from a plurality of MFEs.

2. The method of claim 1, wherein the sample-action flow entry is associated with a logical observation point of a logical forwarding element that spans the particular MFE and the set of MFEs.

3. The method of claim 2, wherein the logical observation point is associated with an ingress port or egress port of the logical forwarding element.

4. The method of claim 1 further comprising at the MFE:
   receiving sample-action flow entry data from a controller; and
   generating the sample-action flow entry from the received data.

5. The method of claim 1 further comprising at the MFE receiving the sample-action flow entry from a controller.

6. The method of claim 1, wherein the sample-action flow entry is associated with a packet modification point in the logical processing pipeline for modifying the packets processed at that point.

7. The method of claim 1, wherein the sample-action flow entry is associated with an address translation point in the logical processing pipeline for changing addresses that are contained in the packets processed at that point.

8. The method of claim 1, wherein the sample-action flow entry is associated with a firewall enforcement point in the logical processing pipeline that applies a set of one or more firewall rules to packets.

9. The method of claim 1, wherein the sample-action flow entry includes the logical network probe identifier, a set of matching criteria that identifies the packets that match the flow entry, and a sampling percentage that directs the particular MFE to only sample a percentage of the packets that satisfy the matching criteria.

10. The method of claim 1, wherein sending the data information regarding the data packet to a data collector comprises:
    generating sample data based on the received packet;
    providing the generated data to a daemon that aggregates the sample data from a plurality of packets that match the sample flow entry at the particular MFE, and forwards the aggregated data to the set of data collectors.

11. A non-transitory machine readable medium storing a particular managed forwarding element (MFE) for execution by at least one processing unit of a particular host computer and gathering data for packets associated with a logical network implemented by the particular MFE and a set of one or more MFEs executing on a set of one or more other host computers, the particular MFE comprising sets of instructions for:

receiving a data packet associated with the logical network;

processing the packet according to a logical processing pipeline for the logical network, the logical processing pipeline including a sample-action flow entry;

based on the data packet matching the sample-action flow entry, sending information regarding the data packet to a data collector that receives information regarding data packets for the logical network from a plurality of MFEs.

12. The non-transitory machine readable medium of claim 11, wherein the sample-action flow entry is associated with a logical observation point of a logical forwarding element that spans the particular MFE and the set of MFEs.

13. The non-transitory machine readable medium of claim 12, wherein the logical observation point is associated with an ingress port or egress port of the logical forwarding element.

14. The non-transitory machine readable medium of claim 11, wherein the set of instructions for sending the data information regarding the data packet to a data collector comprises sets of instructions for:

generating sample data based on the received packet;

providing the generated data to a daemon that aggregates the sample data from a plurality of packets that match the sample flow entry at the particular MFE, and forwards the aggregated data to the set of data collectors.

15. The non-transitory machine readable medium of claim 14, wherein the daemon aggregates the sample data by producing analysis data from the sample data, and forwards the analysis data to the set of data collectors.

16. The non-transitory machine readable medium of claim 11, wherein the particular MFE further comprises sets of instructions for:

receiving sample-action flow entry data from a controller; and generating the sample-action flow entry from the received data.

17. The non-transitory machine readable medium of claim 11, wherein the particular MFE further comprises a set of instructions for receiving the sample-action flow entry from a controller.

18. The non-transitory machine readable medium of claim 11, wherein the sample-action flow entry is associated with a packet modification point in the logical processing pipeline for modifying the packets processed at that point.

19. The non-transitory machine readable medium of claim 11, wherein the sample-action flow entry is associated with an address translation point in the logical processing pipeline for changing addresses that are contained in the packets processed at that point.

20. The non-transitory machine readable medium of claim 11, wherein the sample-action flow entry is associated with a firewall enforcement point in the logical processing pipeline that applies a set of one or more firewall rules to packets.

21. The non-transitory machine readable medium of claim 11, wherein the sample-action flow entry includes the logical network probe identifier, a set of matching criteria that identifies the packets that match the flow entry, and a sampling percentage that directs the particular MFE to only sample a percentage of the packets that satisfy the matching criteria.

* * * * *